US012001739B1

(12) United States Patent
Colelli et al.

(10) Patent No.: US 12,001,739 B1
(45) Date of Patent: Jun. 4, 2024

(54) PROXIMITY BASED USER AUTHENTICATION FOR MULTI-FUNCTION DEVICES

(71) Applicant: Xerox Corporation, Norwalk, CT (US)

(72) Inventors: Dianne Colelli, Webster, NY (US); Cheryl A. Nazzaro, Fairport, NY (US); Mirelsa Fontanes-Perez, Webster, NY (US); Sanja Pstrocki-Porras, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/329,458

(22) Filed: Jun. 5, 2023

(51) Int. Cl.
*G06F 3/12* (2006.01)
(52) U.S. Cl.
CPC .......... *G06F 3/1238* (2013.01); *G06F 3/1204* (2013.01); *G06F 3/1222* (2013.01); *G06F 3/1287* (2013.01); *G06F 3/129* (2013.01); *G06F 3/1292* (2013.01)
(58) Field of Classification Search
CPC .... G06F 3/1238; G06F 3/1204; G06F 3/1292; G06F 21/30; G06F 21/31; G06F 2211/003
USPC ........................................................ 358/1.15
See application file for complete search history.

(56) References Cited

U.S. PATENT DOCUMENTS

| 10,841,735 | B1 | 11/2020 | Zehler | |
|---|---|---|---|---|
| 2016/0094756 | A1* | 3/2016 | Onishi | H04N 1/0097 358/1.14 |
| 2017/0126671 | A1* | 5/2017 | Haapanen | G06F 3/1222 |
| 2017/0134609 | A1* | 5/2017 | Park | H04N 1/32776 |
| 2018/0115454 | A1* | 4/2018 | Kodimer | H04W 4/70 |

OTHER PUBLICATIONS

Guo-Yau Lin, "Touchless Automatic Configuration of Print System," U.S. Appl. No. 17/806,909, filed Jun. 14, 2022, 27 pages.

* cited by examiner

Primary Examiner — Jamares Q Washington (57) ABSTRACT

A multi-function device (MFD) is disclosed. For example, the MFD includes a local communication interface, a proximity sensor to detect a user within a detection range, a processor, and a non-transitory computer-readable medium storing a plurality of instructions. The instructions when executed by the processor cause the processor to perform operations that include detecting the user within the detection range via the proximity sensor, scanning a mobile device of the user for a device identification via the local communication interface, determining that the device identification is associated with the user that is authorized on the MFD, and automatically logging the user into the MFD.

13 Claims, 5 Drawing Sheets

PROXIMITY BASED USER AUTHENTICATION FOR MULTI-FUNCTION DEVICES

The present disclosure relates generally to multi-function devices and relates more particularly to a method and apparatus to proximity based authentication for users and multi-function devices.

BACKGROUND

Multi-function devices (MFDs) can be used to perform a variety of different functions. For example, MFDs can print documents, copy documents, fax documents, scan documents, scan and email documents, and the like. MFDs have evolved as isolated machines to more complex networked machines that can be connected to other MFDs or a print server that can manage the operation of multiple different MFDs.

MFDs may include more complex user interfaces as well. The user interfaces can be customized for different users. Users may have user accounts for MFDs and an MFD may be customized based on the user account that is logged into the MFD.

SUMMARY

According to aspects illustrated herein, there are provided a multi-function device (MFD) and a method for automatically logging in a user on the MFD based on proximity. One disclosed feature of the embodiments is an MFD that comprises a local communication interface, a proximity sensor to detect a user within a detection range, a processor, and a non-transitory computer-readable medium storing a plurality of instructions. The instructions when executed by the processor cause the processor to perform operations that include detecting the user within the detection range via the proximity sensor, scanning a mobile device of the user for a device identification via the local communication interface, determining that the device identification is associated with the user that is authorized on the MFD, and automatically logging the user into the MFD.

Another disclosed feature is a method for automatically logging in a user on the MFD based on proximity. The method executed by a processor of the MFD comprises receiving a signal that a user is within a detection range of a proximity sensor of the MFD, scanning a mobile device of the user for a device identification via a local communication interface, determining that the device identification is associated with the user that is authorized on the MFD, and automatically logging the user into the MFD.

Another disclosed feature is a method for automatically logging in a user on the MFD based on proximity. The method executed by a processor of a mobile device comprises detecting a Bluetooth signal of a multi-function device (MFD) that is broadcast in response to a proximity sensor of the MFD detecting a user of the mobile device within a detection range, receiving a Bluetooth identification of the MFD, transmitting a request to automatically log in the user on the authorized MFD, and transmitting a pending print job to the authorized MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for proximity based authentication for users and multi-function devices. As discussed above, MFDs may include more complex user interfaces as well. The user interfaces can be customized for different users. Users may have user accounts for MFDs and an MFD may be customized based on the user account that is logged into the MFD.

However, currently users are required to manually log into an MFD. For example, a user may access a user interface of the MFD and enter a username and password. The user interface of the MFD can be relatively small and it may be difficult to enter the username and password using the small touch screen interface of the MFD. In addition, it may be cumbersome to manually log into and log out of the MFD each time a user wants to use the MFD.

The present disclosure provides an apparatus and method to automatically log a user into the MFD using proximity based authentication. For example, the MFD may leverage short range or local wireless communication with a mobile device of a user to authenticate the user. The user may register his or her mobile device with the MFD and the MFD may detect whether the mobile device is authorized to access the MFD based information exchanged over the short range wireless communication and the pre-registered information.

In addition, the MFD may include a proximity sensor. Thus, although the short range wireless communication may have a relative wide range, the proximity sensor may ensure that a user is at the MFD. The combination of the short range wireless communication and the proximity sensor may ensure a user is at the MFD and automatically authenticate the user. Thus, the present disclosure can eliminate the need to manually log into the MFD each time the user wants to access the MFD.

Figure 1:
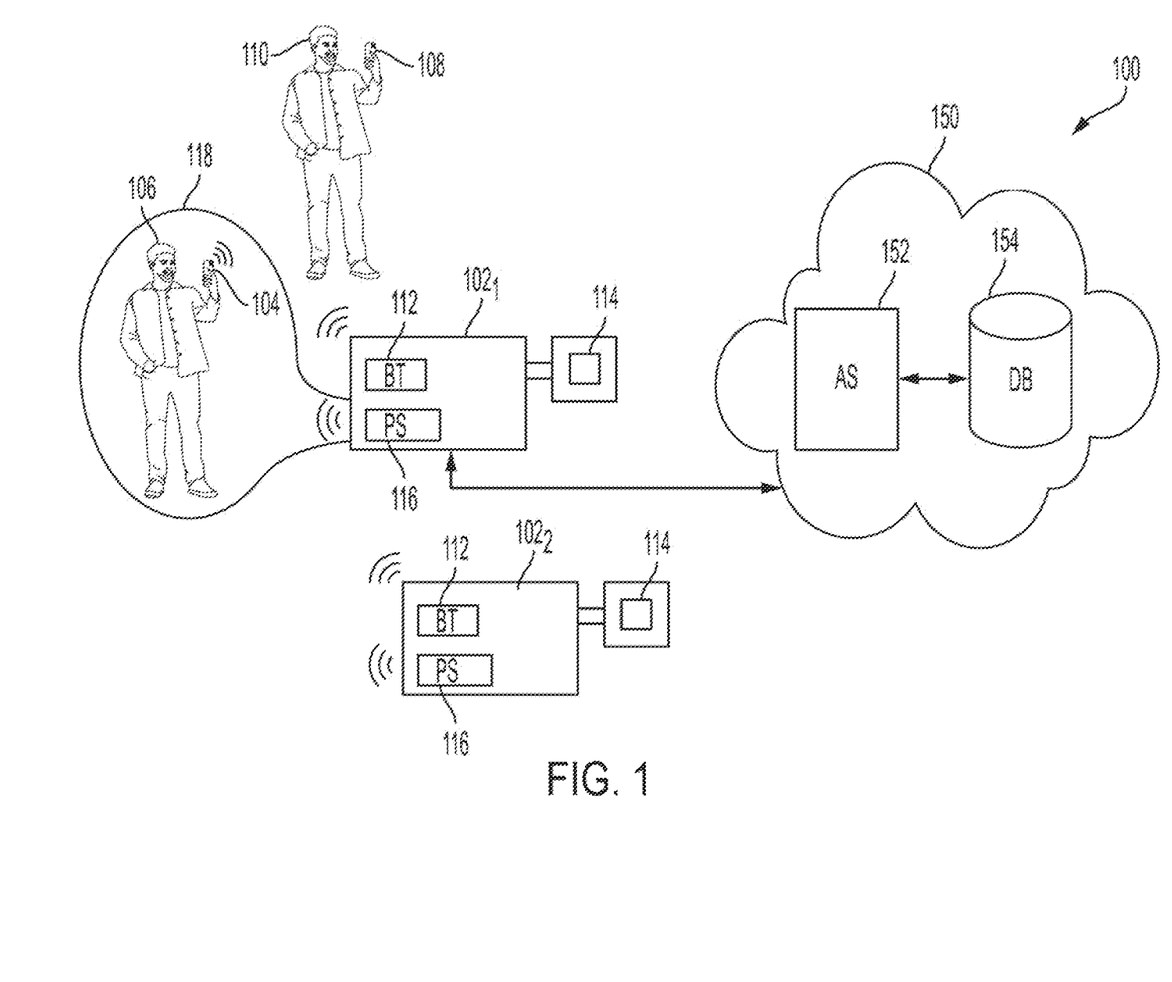
FIG. 1 illustrates a block diagram of an example network of the present disclosure.

FIG. 1 illustrates an example network 100 of the present disclosure. In one embodiment, the network 100 may include one or more multi-function devices (MFDs) $102_1$ and $102_2$ (also hereinafter referred to individually as an MFD 102 or collectively as MFDs 102), one or more mobile devices 104 and 108, and an Internet protocol (IP) network 150. In one embodiment, the IP network 150 may be any type of data packet network. The IP network 150 may include an application server (AS) 152 and a database (DB) 154.

It should be noted that the IP network 150 has been simplified for ease of explanation and may include additional networks and/or network components that are not shown. For example, the IP network 150 may include additional access networks (e.g., a broadband access network, a cellular access network, and the like) or additional network elements (e.g., a router, a border element, a firewall, a network switch, and the like).

In one embodiment, the AS 152 may be an authentication server or a print server that manages print jobs. For example, the AS 152 may manage print jobs for the MFDs $102_1$ and $102_2$ that are communicatively coupled to the IP network 150.

In one embodiment, the DB 154 may store user account information and settings. For example, users may have personalized work flows and/or user interface settings stored in the DB 154. When users log into the MFD $102_1$ or $102_2$, the user settings may be retrieved from the DB 154 and implemented onto the MFDs $102_1$ or $102_2$.

As noted above, the network 100 may also include MFDs $102_1$ or $102_2$. Although two MFDs are illustrated in FIG. 1, it should be noted that any number of MFDs may be deployed in the network 100. In one embodiment, the MFDs $102_1$ or $102_2$ may be located within a common building, but located in different areas. For example, the MFD $102_1$ and $102_2$ may be located on different floors of a building, or on opposite ends of the same floor for different departments, and the like.

The MFDs $102_1$ and $102_2$ may be an electronic device that can perform a variety of different functions. For example, the MFDs $102_1$ and $102_2$ may perform printing functions, scanning functions, copying functions, faxing functions, scan to email functions, scan to cloud functions, and the like. The MFDs $102_1$ and $102_2$ may include printer hardware and/or document scanning hardware.

In one embodiment, the MFDs $102_1$ and $102_2$ may each include a local communication interface 112 (e.g., a Bluetooth (BT) transceiver), a user interface 114, and a proximity sensor (PS) 116. Although the user interface 114 is illustrated as being part of the MFD $102_1$, it should be noted that the user interface may also be shown on the mobile device 104. For example, a personalized user interface may be displayed on the mobile device 104 to allow the user 106 to provide inputs via the mobile device 104 rather than the user interface 114 of the MFD $102_1$.

In one embodiment, the proximity sensor 116 may wirelessly detect objects or persons near the MFDs $102_1$ and $102_2$. In one embodiment, "near" may be defined as being within a detection range 118 of the proximity sensor 116. The detection range 118 may include a two-dimensional area or may include a set distance from the proximity sensor 116. The detection range 118 may be predefined (e.g., the range may be set via an installation application or the user interface 114 of the MFD 102) or may be determined based on a type and/or range of the proximity sensor 116.

The proximity sensor 116 may be an inductive proximity sensor, a capacitive proximity sensor, or a magnetic proximity sensor. The inductive, capacitive, and magnetic proximity sensors can be used to detect nearby electrical devices, such as the mobile devices 104 and/or 108. In another example, the proximity sensor 116 may be an ultrasonic proximity sensor to detect the presence of a user 106 or 110 nearby the MFD $102_1$ or $102_2$.

Figure 2:
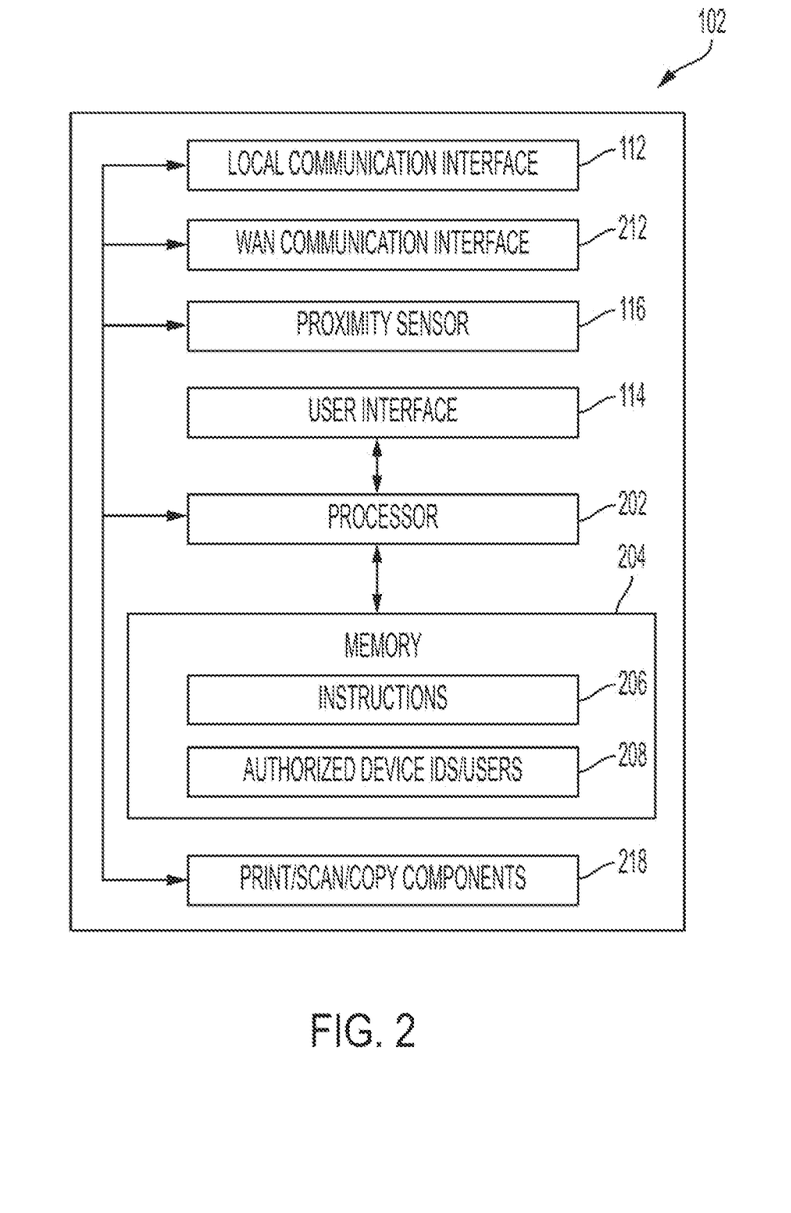
FIG. 2 illustrates a block diagram of an example MFD of the present disclosure.

FIG. 2 illustrates a block diagram of an example of the MFD $102_1$ or $102_2$. In one embodiment, the MFD 102 may include a processor 202, a memory 204, the local communications interface 112, a wide area network (WAN) communication interface 212, the proximity sensor 116, the user interface 114, and print/scan/copy components 218. The processor 202 may be communicatively coupled to the memory 204, the local communication interface 112, the WAN communication interface 212, the proximity sensor 116, the user interface 114, and the print/scan/copy components 218. The processor 202 may control operation of and/or transmit/receive data for automatically logging in the user 106 or 110 via the local communication interface 112, the WAN communication interface 212, the proximity sensor 116, the user interface 114, and/or the print/scan/copy components 218.

In one embodiment, the local communication interface 112 may be a short range wireless communication interface. For example, the local communication interface 112 may be a low energy signal, such as a Bluetooth radio signal. The Bluetooth radio signals may be broadcast within a specific frequency range (e.g., 2.40 gigahertz to 2.48 gigahertz) using Bluetooth communication protocols.

In one embodiment, the WAN communication interface 212 may be wireless or wired connection to establish a communicative connection to the IP network 150. For example, the WAN communication interface 212 may be an Ethernet connection, a WiFi radio, a fax over IP connection that uses an RJ-111 connection, a cellular radio, and the like.

As noted above, the proximity sensor 116 may be any type of sensor to detect electronic devices or the presence of a person. For example, the proximity sensor 116 may be an inductive proximity sensor, a capacitive proximity sensor, a magnetic proximity sensor, an ultrasonic proximity sensor, and the like.

In one embodiment, the user interface 114 may be a graphical user interface (GUI). The user interface 114 may be a touch screen interface or be a GUI that receives inputs via a keyboard, mouse, a trackpad, and the like. The user interface 114 may provide notifications, prompts, and/or data fields for a user, as discussed herein. The user interface 114 may be configured based on personalization settings of the user 106 or user 110 after the user 106 or user 110 is automatically logged into the MFD $102_1$ or $102_2$, as discussed in further details below.

In one embodiment, the print/scan/copy components 218 may include various components to perform print, scan, and copy functions of the MFD $102_1$ and $102_2$, as described above. For example, the print/scan/copy components 218 may include various printing components, document-scanning hardware, an optical scanner, a digital front end, a paper path, ink or toner, a paper tray, one or more finishing modules, and the like.

In one embodiment, the memory 204 may be any type of non-transitory computer readable medium. For example, the memory 204 may be a hard disk drive, a solid state drive, a random access memory, a read only memory, and the like. The memory 204 may store instructions 206 and authorized device identifications (IDs) and/or users 208. In one embodiment, the authorized device IDs and/or users 208 may also be stored in the DB 154 in the IP network 150.

In one embodiment, the instructions 206 may be executed by the processor 202 to perform the functions described herein to automatically login a user on the MFD based on proximity. For example, the instructions 206 may cause the processor to perform operations of the method 300 illustrated in FIG. 3, and discussed in further detail below.

Returning to FIG. 1, in one embodiment, the MFDs $102_1$ and $102_2$ may automatically detect a proximity of the user 106 and/or 110 and automatically log the user 106 or 110 into the MFDs $102_1$ or $102_2$. In addition, the mobile devices 104 and 108 may include an application that can be used to automatically log into the MFDs $102_1$ or $102_2$ based on detected proximity to the MFDs $102_1$ or $102_2$. The application can be executed by a processor (not shown) of the mobile device 104 or 108.

An illustrative example is described below with respect to the MFD $102_1$. However, it should be noted that the MFD $102_2$ may equally perform the functions described herein.

In one embodiment, the users 106 and 110 may pre-register their account information with the MFD $102_1$ or in the IP network 150 via the AS 152 and DB 154. The account information may include log in information (e.g., username and password), mobile device identification (e.g., a unique Bluetooth identifier), personalized user interfaces, personalized work-flows, pending print jobs, and the like.

In one embodiment, the proximity sensor 116 of the MFD $102_1$ may continuously scan for a user (e.g., the user 106 or 110) or mobile device (e.g., the mobile device 104 or 108). The user 106 may move within the detection range 118 of the proximity sensor 116. In response to detecting the user 106 and/or the mobile device 104, the local communication interface 112 may be activated to begin broadcasting a signal. For example, the signal may be a Bluetooth signal to exchange information with the mobile device 104. The MFD $102_1$ may scan the mobile device 104 for the unique Bluetooth identifier associated with the mobile device 104.

In one embodiment, the MFD $102_1$ may locally store authorized users and associated Bluetooth identifiers associated with a user's mobile device. In another embodiment, the MFD $102_1$ may store the authorized users and associated Bluetooth identifiers in the DB 154 in the IP network 150. The MFD $102_1$ may match the Bluetooth identifier from the mobile device 104 from the authorized device IDs/users 208 stored locally in the memory 204 or may establish a communication path to the IP network 150 to match from a list stored in the DB 154.

If a match of the Bluetooth identifier of the mobile device 104 is found, the MFD $102_1$ may automatically log the user 106 into the MFD $102_1$. For example, the MFD $102_1$ may retrieve the username and password of the user 106 locally from the memory 204 or from the DB 154 to automatically log the user 106 into the MFD $102_1$.

Once the user 106 is logged into the MFD $102_1$, the MFD $102_1$ may automatically configure the MFD $102_1$ in accordance with information associated with the account of the user 106. For example, configuring the MFD $102_1$ may include configuring the user interface (user interface 114 of the MFD $102_1$ or on the mobile device 104 of the user 106), retrieving and executing any pending jobs associated with the user's account, providing custom notifications or status information, and the like.

For example, the personalized user interface may have a desired layout, a personalized arrangement of icons on a home screen, a desired language other than English, a desired color scheme, and the like. After the user 106 is logged into the MFD $102_1$, the MFD $102_1$ may retrieve personalized settings associated with the user 106 from the AS 152 of the DB 154 and apply the personalized settings temporarily while the user 106 is logged into the MFD $102_1$. The MFD $102_1$ may also include personalized workflows in the user interface 114.

In one embodiment, configuring the MFD $102_1$ may include loading pending print jobs of the user 106 into a local print queue of the MFD $102_1$. For example, the user 106 may have sent print jobs to the AS 152 in a managed print server environment. The MFD $102_1$ may retrieve any pending print jobs associated with the account of the user 106 when the user 106 is automatically logged into the MFD $102_1$.

In one embodiment, configuring the MFD $102_1$ may include configuring the MFD $102_1$ to provide certain notifications or information based on the job type of the user 106. For example, the user 106 may be a technician. After the MFD $102_1$ automatically logs the user 106 into the MFD $102_1$, the MFD $102_1$ may determine that the user 106 is a technician based on the log-in information and display on the user interface 114, or transmit to the mobile device 104, status information of the MFD $102_1$. For example, the status information may indicate any errors on the MFD $102_1$, print capabilities of the MFD $102_1$ (e.g., color printing, available paper sizes for printing, photo printing, and the like), a size of the print queue (e.g., a number of currently pending print jobs), and the like.

The detail level of the status information may be configured based on the job type of the user 106 that is logged in. For example, a technician may receive notifications with detailed error reports and system diagnostic information. A non-technician employee may receive general error information. Thus, if the user 106 is a non-technician, the user 106 may be provided enough information to indicate that the MFD $102_1$ is malfunctioning and be provided an option to redirect any pending print jobs to another printer (e.g., MFD $102_2$) that is functional. In another example, the MFD $102_1$ may provide a print queue size for non-technician users 106 and provide an option to redirect pending print jobs to another MFD 102 that may have a smaller print queue.

In one embodiment, while the user 106 is logged into the MFD $102_1$ a second user 110 may enter the detection range 118 of the MFD $102_1$. In one embodiment, the MFD $102_1$ may be configured to ignore the mobile device 108 of the user 110 when another user is already logged into the MFD $102_1$.

In one embodiment, the MFD $102_1$ may be configured to ignore the mobile device 108 if the user 110 is within the detection range 118 for a period of time less than a threshold (e.g., 5 seconds). For example, the user 110 may be walking by the MFD $102_1$.

In one embodiment, when the user 110 remains within the detection range 118, the MFD $102_1$ may emit a Bluetooth signal via the local communication interface 112 to scan the mobile device 108. The MFD $102_1$ may display a notification on the user interface 114 that includes the Bluetooth identification of the mobile device 104 and the mobile device 108. The notification may include an option to select which mobile device 104 or 108 should be logged into the MFD $102_1$.

For example, the user 110 may be simply stopping by to speak with the user 106. Thus, the user 106 may select the Bluetooth identification of the mobile device 104 and remain logged into the MFD $102_1$. In another example, the user 110 may be waiting to use the MFD $102_1$ and the user 106 may be finished. Thus, the user 110 may select the Bluetooth identification of the mobile device 108 to automatically log out the user 106 and log the user 110 into the MFD $102_1$.

In one embodiment, a personal identification number associated with the user 110 may be requested via the user interface 114 when multiple users are detected by the proximity sensor 116. The personal identification number may be a four digit numerical code or any other alpha numeric passcodes that can be stored in the memory 204 of the MFD $102_1$ or the DB 154 in the user's account information. The personal identification number may prevent a user from accessing another user's account when another user is within the detection range 118 of the MFD $102_1$.

In one embodiment, the automatic log-in may be controlled by an application on the mobile device 104. For example, the user 106 may enter the detection range 118 of the proximity sensor 116. In response the MFD 102₁ may broadcast a Bluetooth signal. The mobile device 104 may receive a Bluetooth identification of the MFD 102₁ and determine that the MFD 102₁ is an authorized MFD. In other words, the user 106 is authorized to access the MFD 102₁. The list of authorized MFDs may be stored locally in the memory of the mobile device 104 via the application.

The application may cause the mobile device 104 to transmit a request to automatically log in the user on the authorized MFD. The MFD 102₁ may then check to see if the user 106 is authorized, as described above. If the user 106 is authorized, the MFD 102₁ may automatically log the user 106 into the MFD 102₁. The user 106 may then transmit a pending print job to the authorized MFD 102₁ or any other job requests that the MFD 102₁ is capable of executing.

Thus, the present disclosure provides an MFD 102 with a combination of a local communication interface 112 and a proximity sensor 116 to automatically log a user into the MFD 102. The combination of the proximity sensor 116 with the local communication interface 112 may help to lower energy consumption and ensure that the local communication interface 112 is activated when a user is nearby the MFD 102. For example, local communication interfaces 112, such as Bluetooth radio, may have a relatively wide range. However, the proximity sensor 116 may limit the detectable range 118 to an area that is within the immediate vicinity of the MFD 102 (e.g., immediately next to and up to 5 feet or less). This may prevent false positives when users walk by the MFD 102 or constant processing by the MFD 102 to begin the automatic log in process when users walk by the MFD 102. Typically, when a user intends to use the MFD 102, the user may come up to the MFD 102 (e.g., within 1-2 feet of the MFD 102).

As a result, the combination of the proximity sensor 116 and the local communication interface 112 may provide a convenient way for users to automatically log into the MFD 102. This may create a more enjoyable and efficient user experience around the MFD 102.

Figure 3:
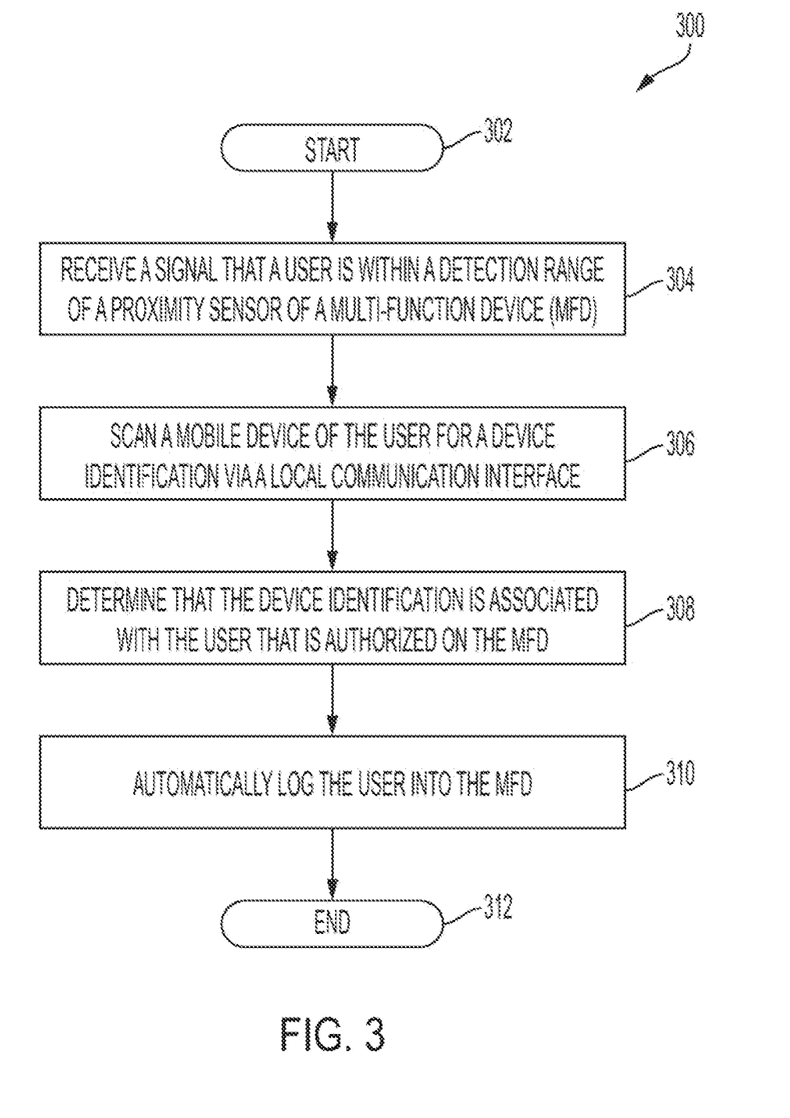
FIG. 3 illustrates a flow chart for a method of automatically logging in a user on the MFD based on proximity of the present disclosure from the perspective of the MFD.

FIG. 3 illustrates a flow chart of an example method 300 for automatically logging in a user on the MFD based on proximity of the present disclosure. In one embodiment, the method 300 may be performed by the MFD 102 or by an apparatus such as the apparatus 500 illustrated in FIG. 5 and discussed below.

In one embodiment, the method 300 begins at block 302. At block 304, the method 300 detects the user within the detection range via the proximity sensor. For example, the proximity sensor may detect when a user or electronic device is nearby the MFD (e.g., less than 5 feet away from the MFD).

In one embodiment, the proximity sensor may wirelessly detect objects or persons near the MFD. In one embodiment, "near" may be defined as being within a detection range of the proximity sensor. The detection range may include a two-dimensional area or may include a set distance from the proximity sensor. The detection range may be predefined or may be determined based on a type and/or range of the proximity sensor.

The proximity sensor may be an inductive proximity sensor, a capacitive proximity sensor, or a magnetic proximity sensor. The inductive, capacitive, and magnetic proximity sensors can be used to detect nearby electrical devices, such as a mobile device of the user. In another example, the proximity sensor may be an ultrasonic proximity sensor to detect the presence of the user nearby the MFD.

At block 306, the method 300 scans a mobile device of the user for a device identification via a local communication interface. For example, detection of the user or the mobile device of the user may cause a local communication interface to be activated. The local communication interface may be a Bluetooth radio that operates on wireless frequencies assigned to Bluetooth radio communications. The MFD may broadcast a Bluetooth signal to establish a communication with the mobile device of the user.

The mobile device of the user may be scanned via the Bluetooth signals to capture a device identification of the mobile device. The device identification may be a unique Bluetooth identifier. However, other device identifications may also be used, such as, for example, a device serial number, a media access control (MAC) identification number, and the like.

At block 308, the method 300 determines that the device identification is associated with the user that is authorized on the MFD. In one embodiment, the determination that the user is authorized may be made locally. For example, the MFD may store a list of authorized device IDs and/or users in a memory of the MFD. The MFD may then compare the device identification of the mobile device to the stored list. If a match is found, the user may be authorized on the MFD.

In another embodiment, the MFD may establish a communication session with an authentication server or print server via a wide area network communication interface. The authentication server may include a database that stores the list of authorized device IDs and/or users. The MFD may transmit the device identification to the authentication server to be matched to the list of authorized device IDs and/or users.

At block 310, the method 300 automatically logs the user into the MFD. For example, if the device identification matches an entry in the list of authorized device IDs and/or users, the MFD may automatically enter the username and password associated with the user into a log in prompt of the MFD. In one embodiment, if the authentication is performed remotely by the authentication server, the MFD may receive the username and password from the authentication server.

After the user is logged into the MFD, the MFD may automatically configure parts of the MFD with account information associated with the user. If the authorization is performed locally, the account information may be stored in the memory of the MFD. If the authorization is performed remotely, the MFD may request the account information from the authentication server and then configure the MFD in accordance with the account information. For example, the account information may include log in information (e.g., username and password), mobile device identification (e.g., a unique Bluetooth identifier), personalized user interfaces, personalized work-flows, pending print jobs, and the like.

In one embodiment, configuring the MFD may include customization actions to personalize certain components of the MFD. For example, after the user is automatically logged into the MFD, the MFD may apply a personalized user interface of the user to the user interface of the MFD. The personalized user interface may rearrange icons, display preferred icons on the home screen, display icons associated with personalized work flows, and the like.

In one embodiment, configuring the MFD may include retrieval and execution of pending jobs associated with the user's account. The pending jobs may be pending print jobs, retrieval of scanned documents from other MFDs, and the like. For example, the MFD may check the print server to see if there are any pending print jobs associated with the user. If pending print jobs are found, the pending print jobs may be retrieved and automatically executed to print the pending print jobs.

In one embodiment, the status of the MFD may be displayed to the user. The status may include any errors or pending print queues. The user may be presented options to redirect pending print jobs to a nearby MFD that has less pending print jobs in the print queue. Thus, MFD may automatically log in a user using a combination of a proximity sensor and a local communication interface, automatically configure the MFD based on account information, and/or automatically execute pending print jobs.

In one embodiment, when the user is finished on the MFD, the user may manually log out of the MFD. In another embodiment, once the user moves out of the detection range of the proximity sensor, the MFD may immediately log the user out of the MFD automatically. Thus, if a user walks away from the MFD without logging out, the MFD may detect the user has walked away via the proximity sensor and log the user out automatically. At block 312, the method 300 ends.

Figure 4:
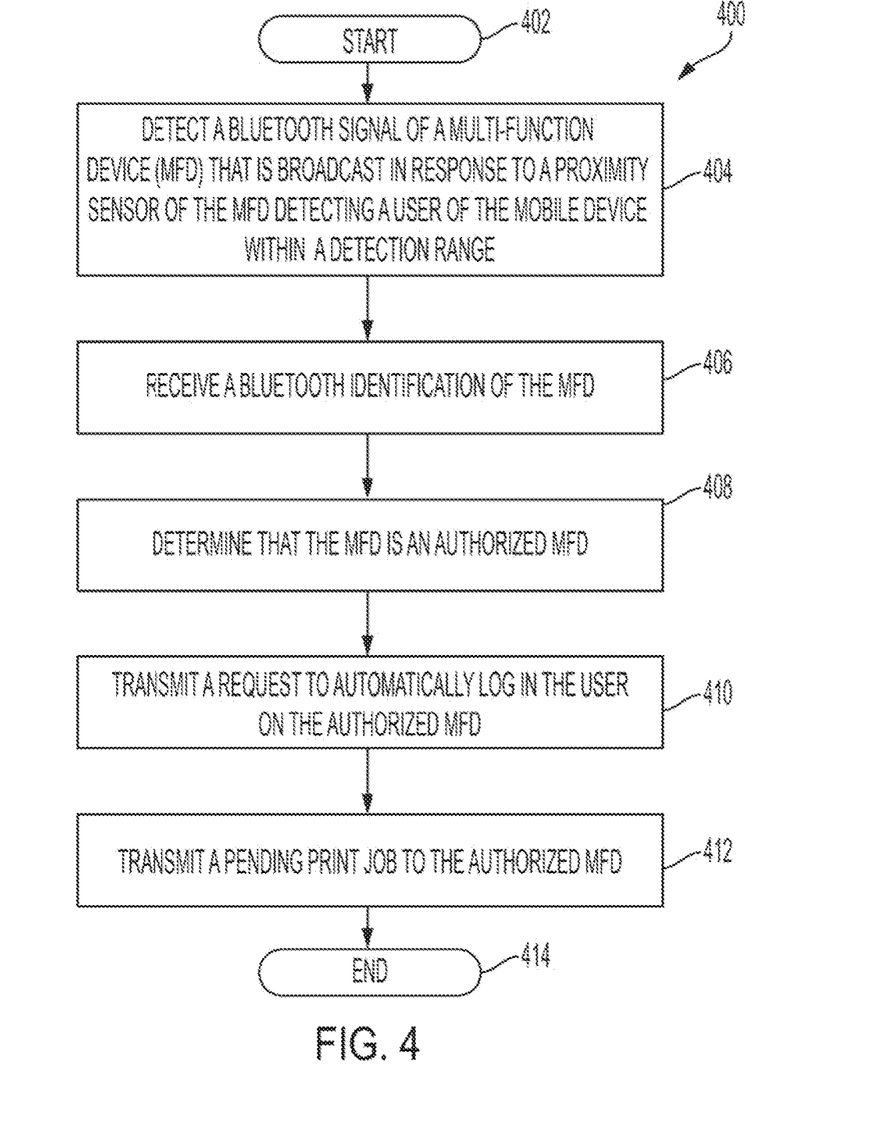
FIG. 4 illustrates a flow chart for a method of automatically logging in a user on the MFD based on proximity of the present disclosure from the perspective of a mobile device of the user.

FIG. 4 illustrates a flow chart of an example method 400 for automatically logging in a user on the MFD based on proximity of the present disclosure. In one embodiment, the method 400 may be performed by the mobile device 104 or 108 or by an apparatus such as the apparatus 500 illustrated in FIG. 5 and discussed below.

In one embodiment, the method 400 begins at block 402. At block 404, the method 400 detects a Bluetooth signal of a multi-function device (MFD) that is broadcast in response to a proximity sensor of the MFD detecting a user of the mobile device within a detection range. For example, a user may walk within the detection range of the proximity sensor of the MFD. In response, the MFD may activate a local communication interface to broadcast a signal (e.g., a Bluetooth signal) to scan the mobile device.

At block 406, the method 400 receives a Bluetooth identification of the MFD. In one embodiment, the broadcast signal from the MFD may include the Bluetooth identification of the MFD.

At block 408, the method 400 determines that the MFD is an authorized MFD. For example, the mobile device may store a list of authorized MFDs in a memory of the mobile device. The user may know which MFDs, the user is authorized to use and include the Bluetooth identification of those MFDs. In one embodiment, the application on the mobile device may scan for the Bluetooth identification of the authorized MFDs during a registration process executed by the application.

At block 410, the method 400 transmits a request to automatically log in the user on the authorized MFD. If the MFD is an authorized MFD, the mobile device may transmit a request to the MFD to automatically log the user into the MFD. For example, the mobile device may transmit a device identification (e.g., a Bluetooth identification of the mobile device) to the MFD. The MFD may then authenticate the user, as described in the method 300.

After the MFD automatically logs the user into the MFD, the MFD may be configured using account information associated with the user. For example, the user interface of the MFD may be personalized, the default language may be changed to a preferred language of the user, pending print jobs may be automatically retrieved, and the like.

At block 412, the method 400 transmits a pending print job to the authorized MFD. For example, the mobile device may have pending print jobs stored locally in the mobile device. When the user is logged into the MFD, the pending print jobs on the mobile device may be transmitted to the MFD for execution. When the user is finished, the user may log out of the MFD or the MFD may automatically log the user out when the user moves outside of the detection range of the proximity sensor. At block 414, the method 400 ends.

Figure 5:
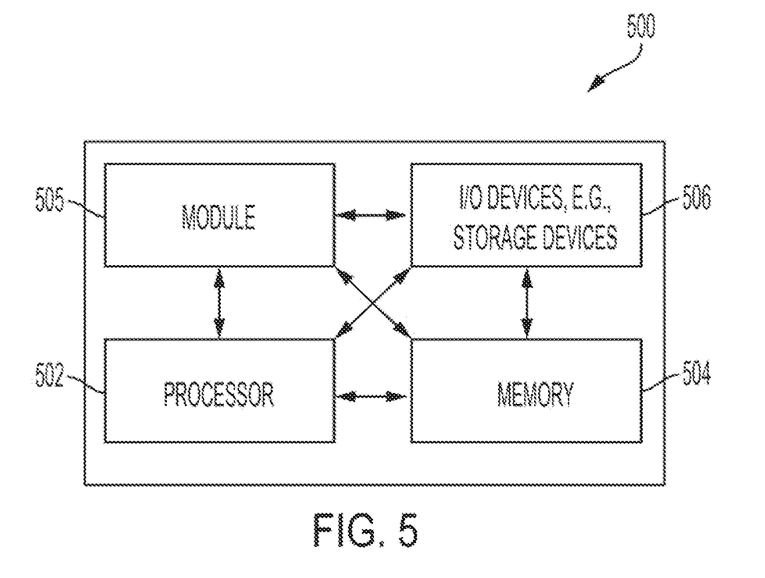
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for automatically logging in a user on the MFD based on proximity, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for automatically logging in a user on the MFD based on proximity (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for automatically logging in a user on the MFD based on proximity (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD) with printing and scanning hardware, comprising:
   a local communication interface;
   a proximity sensor to detect a user within a detection range;
   a processor; and
   a non-transitory computer-readable medium storing a plurality of instructions, which when executed by the processor, causes the processor to perform operations comprising:
      detecting the user within the detection range via the proximity sensor;
      scanning a mobile device of the user for a device identification via the local communication interface;
      determining that the device identification is associated with the user that is authorized on the MFD;
      detecting a second user within the detection range via the proximity sensor;
      determining a second device identification associated with a second mobile device of the second user;
      displaying a notification with the device identification of the mobile device of the user and the second device identification of the second mobile device of the second user on a user interface of the MFD to allow the user to confirm the device identification associated with the user;
      requesting a personal identification number associated with the user when the user and the second user are detected within the detection range; and
      automatically logging the user into the MFD.

2. The MFD of claim 1, wherein the local communication interface comprises a Bluetooth communication interface.

3. The MFD of claim 2, wherein the device identification comprises a Bluetooth ID of the mobile device.

4. The MFD of claim 1, further comprising a wide area network communication interface to establish a connection to an authentication server.

5. The MFD of claim 4, wherein the operations performed by the processor, further comprise:
   requesting account information associated with the user from the authentication server; and
   configuring the MFD in accordance with the account information.

6. The MFD of claim 5, wherein the configuring the MFD in accordance with the account information, comprises the processor performing operations further comprising:
   applying a personalized user interface of the user to the user interface.

7. The MFD of claim 5, wherein the configuring the MFD in accordance with the account information, comprises the processor performing operations further comprising:
   retrieving a pending print job for the user; and
   executing the pending print job for the user on the MFD.

8. A method, comprising:
   receiving, by a processor of a multi-function device (MFD), a signal that a user is within a detection range of a proximity sensor of the MFD;
   scanning, by the processor, a mobile device of the user for a device identification via a local communication interface;
   determining, via the processor, that the device identification is associated with the user that is authorized on the MFD;
   receiving, via the processor, a second signal that a second user is detected within the detection range via the proximity sensor;
   determining, via the processor, a second device identification associated with a second mobile device of the second user;
   displaying, via the processor, a notification with the device identification of the mobile device of the user and the second device identification of the second mobile device of the second user on a user interface of the MFD to allow the user to confirm the device identification associated with the user;
   requesting, via the processor, a personal identification number associated with the user when the user and the second user are detected within the detection range; and
   automatically logging, via the processor, the user into the MFD.

9. The method of claim 8, wherein the local communication interface comprises a Bluetooth communication interface.

10. The method of claim 9, wherein the device identification comprises a Bluetooth ID of the mobile device.

11. The method of claim 8, further comprising:
    establishing, via the processor, a connection to an authentication server via a wide area network communication interface of the MFD;
    requesting, via the processor, account information associated with the user from the authentication server; and
    configuring, via the processor, the MFD in accordance with the account information.

12. The method of claim 11, wherein the configuring the MFD in accordance with the account information, comprises:
    applying, via the processor, a personalized user interface of the user to the user interface.

13. The method of claim 11, wherein the configuring the MFD in accordance with the account information, comprises:
    retrieving, via the processor, a pending print job for the user; and
    executing, via the processor, the pending print job for the user on the MFD.

* * * * *